Jan. 6, 1953 — C. W. FRY — 2,624,487
PAN STACKS
Filed Jan. 25, 1950 — 2 SHEETS—SHEET 1
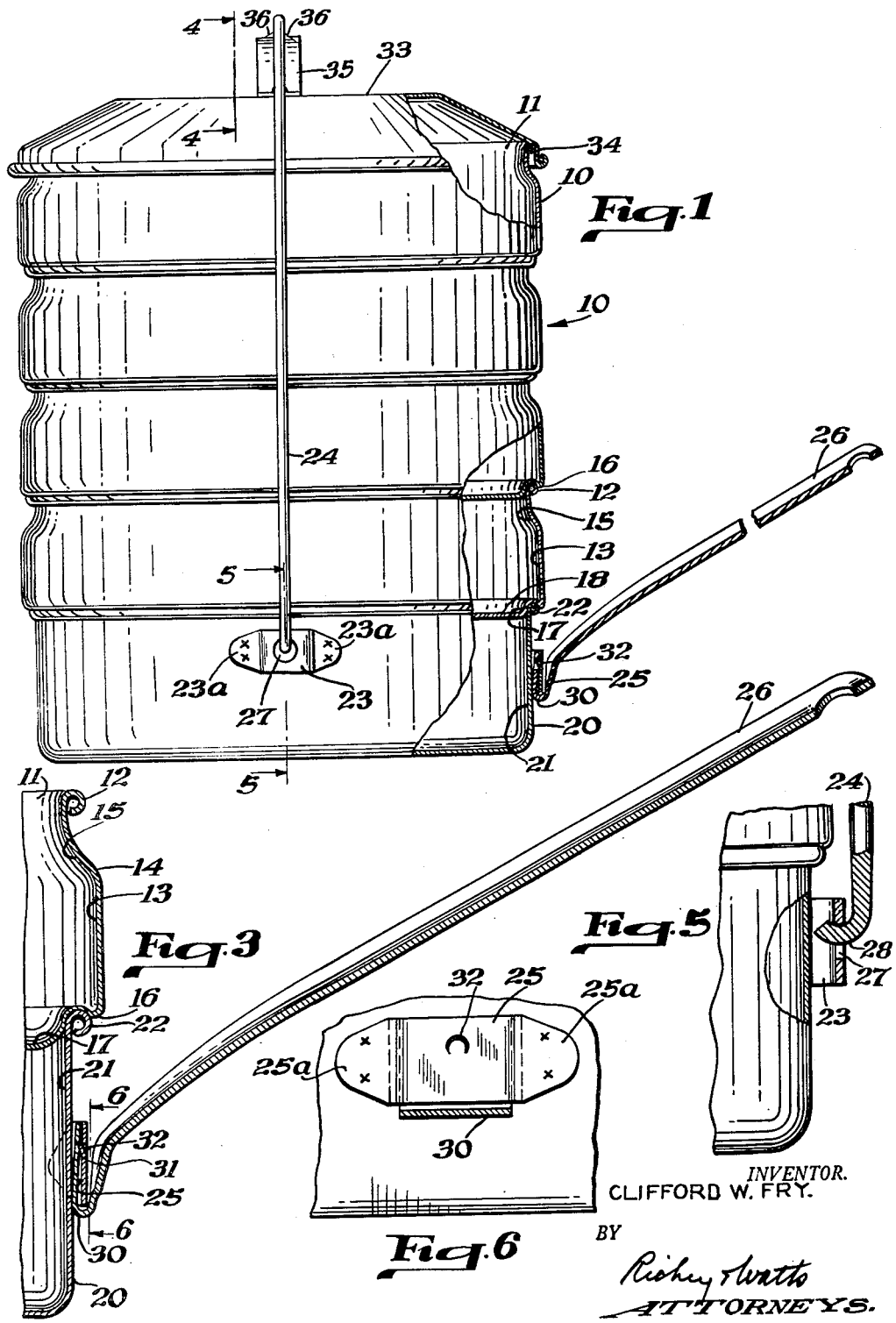
INVENTOR.
CLIFFORD W. FRY.
BY
Richey Watts
ATTORNEYS.

Jan. 6, 1953    C. W. FRY    2,624,487
PAN STACKS
Filed Jan. 25, 1950    2 SHEETS—SHEET 2
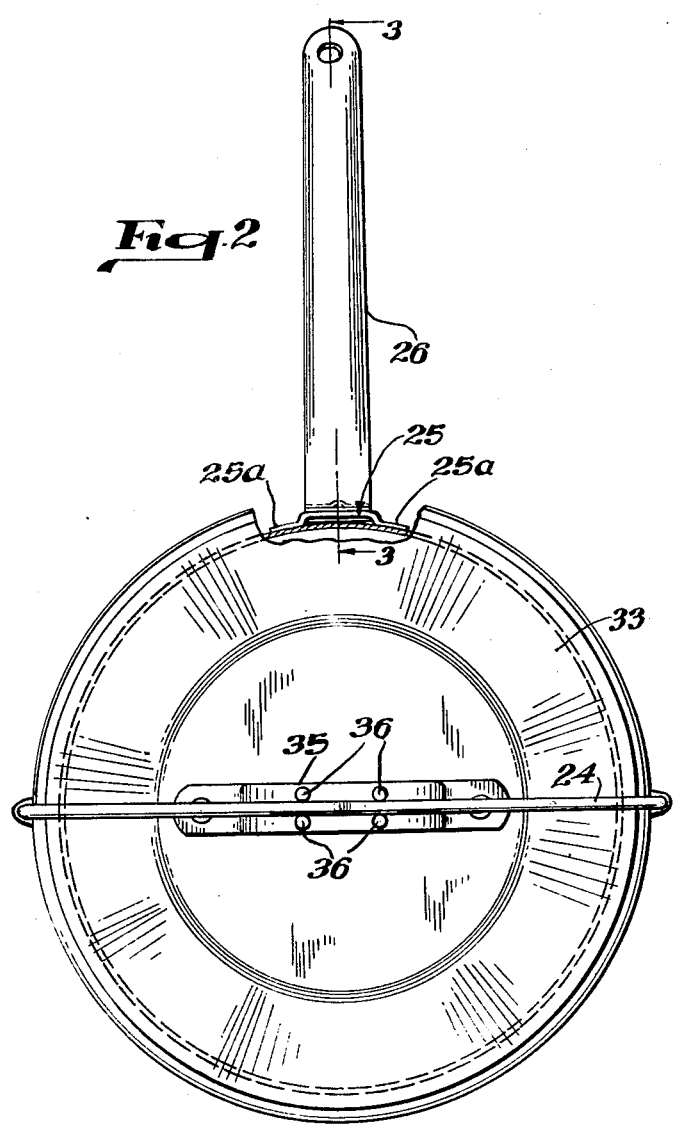
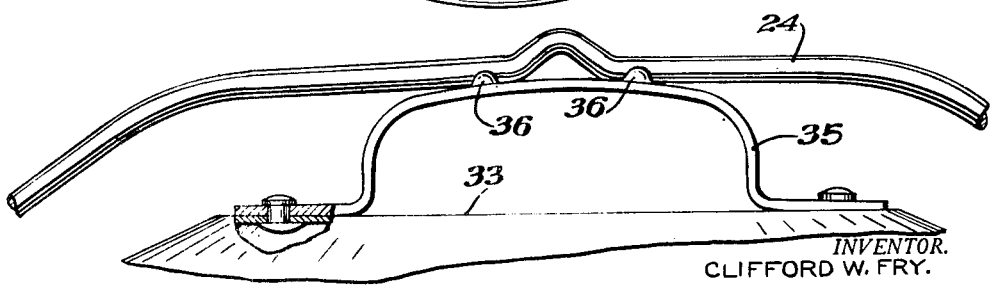
INVENTOR.
CLIFFORD W. FRY.
BY
Richey Watts
ATTORNEYS.

Patented Jan. 6, 1953

2,624,487

UNITED STATES PATENT OFFICE 2,624,487

PAN STACKS

Clifford W. Fry, Wooster, Ohio, assignor to The Buckeye Aluminum Company, Wooster, Ohio, a corporation of Ohio Application January 25, 1950, Serial No. 140,497

5 Claims. (Cl. 220—8)

This invention relates broadly to metal hollow ware and more specifically to improvements in dished or shallow drawn vessels designed for assembly in stacked interlocked relation to form portable sets of pans which may be used either as cooking utensils, food carrying receptacles, or table service plates. The utility of the invention resides primarily in the use thereof at picnics, camping excursions, and similar recreational pursuits.

One of the objects of the invention is to provide a pan which, when seated in stacked relation with other like units, will inhibit the entry of water (rain) or other foreign matter within the voids defined by the assembly.

Another object of the invention is to provide a pan structure having a compound curved section in the base and throat thereof to assure rigidity and facilitate the ultimate engagement of the units.

Another object of the invention is to provide a bail for the support and retention of a plurality of stacked pans, and the snap engagement of the bail with a handle on a cover for the assembled unit.

Another object of the invention is to provide a set of supporting brackets for application upon the side walls of one of the units (or each of them) to facilitate the ready attachment or removal of the bail and handle.

Further objects of the invention reside in the provision of an assembly which is light in weight, sturdy of structure, attractive of appearance, and susceptible of use either as a food receptacle, or, when dismantled, as individual cooking and serving utensils.

Other objects and advantages, more or less ancillary to the foregoing, and the manner in which all the various objects are realized, will appear in the following description, which considered in connection with the accompanying drawings, sets forth the preferred embodiment of the invention.

Fig. 1 is an elevational view of the improved pan assembly, a portion thereof being broken away and shown in section in the interest of clarity;

Fig. 2 is a plan view thereof;

Fig. 3 is a vertical section through a fragmentary portion of one of the pans and the detachable handle and bracket therefor, the section being taken on a plane indicated by the line 3—3 in Fig. 2;

Fig. 4 is a fragmentary sectional view of the top cover handle and relative parts thereof, the view being indicated by the line 4—4 in Fig. 1;

Fig. 5 is a detail view of the retaining bail bracket, shown partially in section, taken on line 5—5 of Fig. 1; and Fig. 6 is a sectional view of the removable handle latch taken on line 6—6 in Fig. 3.

Referring first to Fig. 1, the assembly comprises a plurality of pans 10 formed with a constricted top or throat portion 11 terminating in a rolled bead 12 disposed within the circumference of the major body of the vessel. The bead is rolled outwardly to form a smooth arcuate surface around the top of the inner edge of the pan, and the subjacent throat 11 is struck from an inwardly directed broad sweeping curve defining a concave toric section 15 which is merged with the cylindrical side wall 13 of the pan through an arcuate shoulder 14. The lower edge of the pan is curved inwardly and upwardly to form a lip 16 which overlies and depends slightly below the top of the bead 12 of a lower pan 10. The adjacent portion of the wall defines a channel or groove configured for intimate engagement with substantially one-third of the upper face of the bead and the remaining corner of the pan sweeps downwardly and inwardly to form a convex toric section 17 which flows into a flat subtended wall 18 defining the base or bottom of the vessel. It will be noted that the overhanging lip 16 forms a drip ledge or water shed in the assembly and that the contour of the mating surfaces of the groove and bead and broad area of engagement thereof forms an effective seal between the assembled pan sections.

The lower pan 20 may be of the same configuration as those heretofore described, or, if desired, may be formed with a cylindrical side wall 21, as illustrated, with a bead 22 on the upper edge thereof which is of the same dimension as the bead 12 in the intermediate pan sections of the assembly. The pan 20 may also be formed from stock of heavier gauge and drawn somewhat deeper than the other section in order to provide a cooking utensil of more general utility. The lower pan is provided with a pair of brackets 23 for the retention of the bail 24. The brackets 23 are of channeled cross-section and formed with lateral ears 23a which are welded or otherwise affixed to the side wall of the pan. The center webs of the brackets are pierced to provide openings 27 for the reception of inturned hooks 28 in the free ends of the bail 24.

The handle 26 comprises a bar of arcuate transverse section formed with a downwardly deflected somewhat flattened end portion which terminates in a hook embodying an upwardly directed arm 30 proportioned for engagement in the socket 25. The height of the arm is substantially equal to the depth of the socket, and the upper end thereof is provided with an opening 31. The socket 25 is of channeled cross-section and formed with laterally disposed ears 25a to accommodate the securement thereof upon the pan. The face of the channeled portion of the socket is punched to form an internal tongue 32 disposed for snap engagement in the opening 31 when the arm is pressed into the socket.

The pan assembly includes a lid or cover 33 embodying a domed plate having a depending flange 34 therein designed for snug engagement with the rim of a pan 10. The radius of the shoulder defining the flange is equal to that of the pan bead 12 and the end of the flange terminates in an outwardly rolled section 34 of proportions similar to that of the rolled edges of the pans. The upper face of the cover is provided with an arched strap 35, or handle, preferably riveted thereon and formed with bosses 36 in the upper face thereof. The bosses are configured with inclined side walls normal to the major axis of the strap and the rounded inner ends thereof are disposed for engagement with the opposed sides of the looped upper end of the bail 24. The arms of the bail are designed to maintain the loop of the bail in spring pressed engagement with the top of the strap and the bosses are of a requisite height to effect a cammed snap engagement of the bail with the strap 35.

From the foregoing it will be recognized that the pan sections may be firmly clamped in stacked relation with each other to form a unitary article, which, by virtue of the tightly sealed relation of the rim and base portions of the mating parts, may be used for the transportation and/or storage of food. It will also be apparent that the parts of the assembly when separated may be used as plates or serve as a bucket, sauce pan, skillet, or covered baking dish.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A pan for sealed superposition upon a second similar pan comprising a generally vertical wall portion, a horizontal base portion, an externally concave toroidal portion extending between the base portion and the wall portion forming a recess relative to the base portion and wall portion and the juncture of the toroidal portion and the wall portion forming a lip depending below the level of the toroidal portion, an upper wall portion constricted relative to the wall portion, and an externally convex toroidal portion at the top of said upper wall portion forming a bead, the surface of the upper toroidal portion being similar to the surface of the lower toroidal portion and in vertical alignment therewith.

2. In combination, a plurality of pans, each having a constricted upper portion, a bead at the top of the upper portion, a wall portion, a base, a generally toroidal externally concave portion joining the base and the wall portion, the wall portion forming a lip overhanging the toroidal portion and the toroidal portion and the bead being in vertical alignment whereby each pan may be fitted upon a preceding pan, a top pan, a bottom pan, a cover for the top pan having a portion surrounding the bead of the top pan and depending below the level of the bead, and means for constraining said pans and said cover in tightly superimposed relationship.

3. The invention in accordance with claim 2, said last named means comprising a bail extending from the lower pan and engaging the cover.

4. A pan comprising an intermediate cylindrical wall portion, a constricted upper wall portion, a bead at the top of said upper wall portion, a lip at the bottom of said intermediate wall portion and in alignment therewith, a base having a diameter less than that of the intermediate wall portion, and an exteriorly concave portion between said lip and said base in vertical alignment with said bead, said base portion being below the level of said lip.

5. A pan comprising an intermediate cylindrical wall portion, a constricted upper wall portion, a bead at the top of said upper wall portion, a lip at the bottom of said intermediate wall portion and in alignment therewith, a base having a diameter less than that of the intermediate wall portion, and an arcuately recessed portion between said lip and said base in vertical alignment with said bead, said base portion being below the level of said lip.

CLIFFORD W. FRY.

REFERENCES CITED

The following references are of record in the file of this patent:

UNITED STATES PATENTS

| Number | Name | Date |
|---|---|---|
| 372,337 | Simon | Nov. 1, 1887 |
| 385,257 | Ehle | June 26, 1888 |
| 421,199 | Slaughter | Feb. 11, 1890 |
| 564,040 | Williams | July 14, 1896 |
| 885,475 | Hitchcock | Apr. 21, 1908 |
| 1,203,081 | Bennett | Dec. 12, 1916 |
| 1,797,594 | Taube et al. | Mar. 24, 1931 |
| 2,098,356 | Pfefferkorn et al. | Nov. 9, 1937 |
| 2,119,745 | Ingersoll | June 7, 1938 |
| 2,147,886 | Devine | Feb. 21, 1939 |
| 2,254,168 | Dale | Aug. 26, 1941 |
| 2,340,024 | Skaller | Jan. 25, 1944 |
| 2,501,572 | Marquez | Mar. 21, 1950 |